US010321622B2

(12) United States Patent
Muemken et al.

(10) Patent No.: US 10,321,622 B2
(45) Date of Patent: Jun. 18, 2019

(54) AGRICULTURAL WORKING MACHINE

(71) Applicant: CLAAS INDUSTRIETECHNIK GMBH, Paderborn (DE)

(72) Inventors: Philipp Muemken, Muenster (DE); Helmut Claas, Harsewinkel (DE); Robert Obermeier-Hartmann, Bueren (DE); Hendrik Schulze Zumkley, Rietberg (DE); Thomas Schulte, Delbrueck (DE); Carolin Hammacher, Paderborn (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 15/146,169

(22) Filed: May 4, 2016

(65) Prior Publication Data

US 2016/0325782 A1  Nov. 10, 2016

(30) Foreign Application Priority Data

May 8, 2015  (DE) .................... 10 2015 107 247

(51) Int. Cl.
| | |
|---|---|
| *A01B 69/04* | (2006.01) |
| *B62D 11/24* | (2006.01) |
| *B62D 9/00* | (2006.01) |
| *B62D 11/00* | (2006.01) |

(52) U.S. Cl.
CPC ............ *A01B 69/008* (2013.01); *B62D 9/002* (2013.01); *B62D 11/003* (2013.01); *B62D 11/24* (2013.01)

(58) Field of Classification Search
CPC .... A01B 69/008; B62D 9/002; B62D 11/003; B62D 11/24
See application file for complete search history.

(56) References Cited

U.S. PATENT DOCUMENTS

| | | | |
|---|---|---|---|
| 6,059,383 A | 5/2000 | Paggi et al. | |
| 6,099,090 A | 8/2000 | Paggi et al. | |
| 6,161,905 A * | 12/2000 | Hac ..................... | B60T 8/17551 303/139 |
| 6,169,951 B1 * | 1/2001 | Ghoneim ................ | B60T 8/172 303/140 |

(Continued)

FOREIGN PATENT DOCUMENTS

| | | |
|---|---|---|
| DE | 1270961 | 6/1968 |
| DE | 19857047 | 7/1999 |

(Continued)

*Primary Examiner* — Jess Whittington
(74) *Attorney, Agent, or Firm* — Collard & Roe, P.C.

(57) ABSTRACT

An agricultural working machine has a first axle and a second axle, multiple ground-engaging means disposed at the first and second axles that are at least partially drivable by a drive engine or are steerable using steering-knuckle steering, a steering-angle sensor disposed at a steerable ground-engaging means for detecting a set steering angle ($\delta_{th}$) and a steering brake for the selective braking of one or more drivable, ground-engaging means for steering support. A control unit controls and regulates the at least one steering brake based on a steering angle ($\delta_{th}$, $\delta_{tat}$) or a slip angle ($\alpha$) of at least one of the steerable ground-engaging means.

16 Claims, 3 Drawing Sheets

18 = drive engine
22=steering brake
24=control unit
26=rpm sensor
28 = drive engine sensor
30=transmission sensor
32=steering angle sensor
38=gyroscope
40=navigation system

(56) References Cited

U.S. PATENT DOCUMENTS

| | | | | |
|---|---|---|---|---|
| 6,179,394 | B1* | 1/2001 | Browalski | B60G 17/019 |
| | | | | 303/146 |
| 6,530,442 | B1 | 3/2003 | Satzler | |
| 6,648,426 | B1* | 11/2003 | Boettiger | B60T 8/1755 |
| | | | | 303/146 |
| 7,748,488 | B2 | 7/2010 | Tarasinski et al. | |
| 8,827,048 | B2 | 9/2014 | Mazzucchi et al. | |
| 2007/0144797 | A1* | 6/2007 | Tarasinski | B60K 17/356 |
| | | | | 180/6.28 |
| 2008/0262689 | A1* | 10/2008 | Sayers | B60T 8/246 |
| | | | | 701/70 |
| 2009/0049903 | A1* | 2/2009 | Murakami | B60C 23/064 |
| | | | | 73/146 |
| 2012/0253625 | A1* | 10/2012 | Canuto | B60T 8/1755 |
| | | | | 701/72 |
| 2013/0038118 | A1* | 2/2013 | Brinkley | B62D 11/08 |
| | | | | 303/9.62 |
| 2016/0052546 | A1* | 2/2016 | Arakane | B62D 15/025 |
| | | | | 701/41 |

FOREIGN PATENT DOCUMENTS

| | | |
|---|---|---|
| DE | 19857048 | 7/1999 |
| DE | 10343640 | 4/2005 |
| DE | 69729173 | 5/2005 |
| EP | 0863062 | 9/1998 |
| EP | 2093111 | 8/2009 |
| EP | 2337721 | 6/2011 |
| GB | 2332407 | 6/1999 |
| GB | 2463648 | 3/2010 |

\* cited by examiner

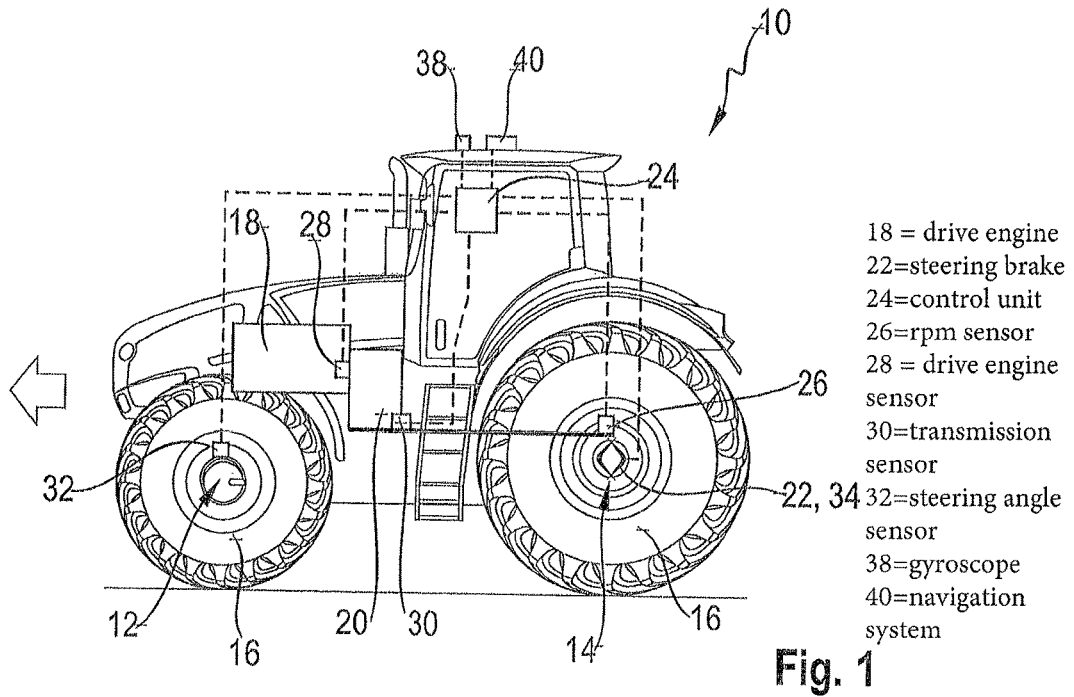
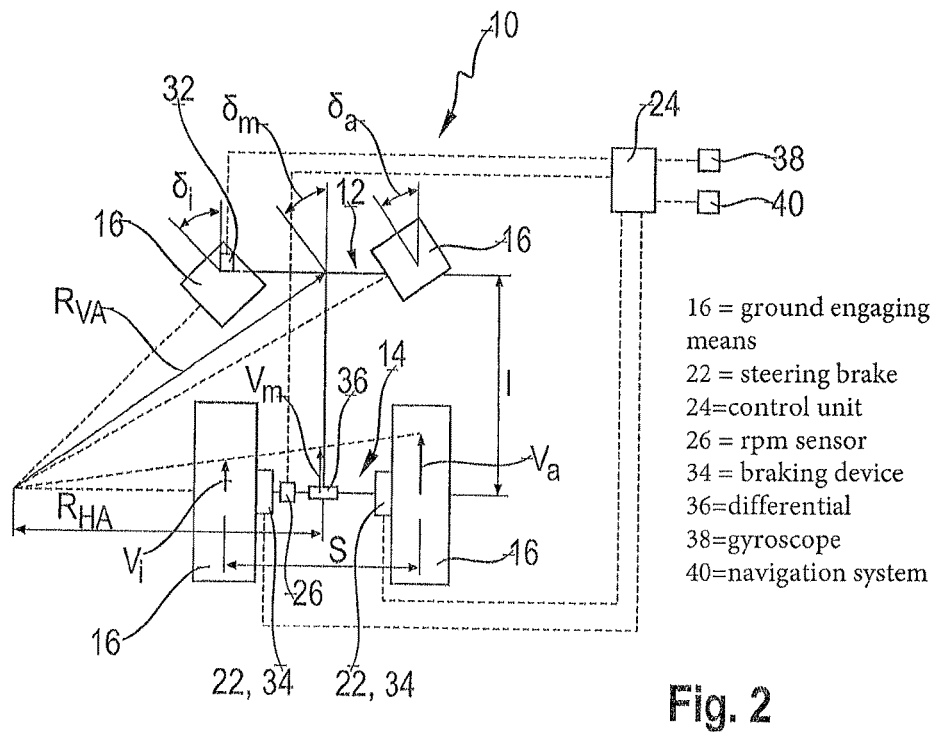

16 = ground engaging means
22 = steering brake
32 = steering angle sensor
34 = braking device 16 = ground-engaging means
32 = steering angle sensor

AGRICULTURAL WORKING MACHINE

CROSS-REFERENCE TO A RELATED APPLICATION

The invention described and claimed hereinbelow is also described in German Patent Application DE 10 2015 107247.5, filed on May 8, 2015. The German Patent Application, the subject matter of which is incorporated herein by reference, provides the basis for a claim of priority of invention under 35 U.S.C. 119(a)-(d).

BACKGROUND OF THE INVENTION

The present invention relates to an agricultural working machine with a control unit for controlling and regulating at least one steering brake for selective braking of at least one of multiple, ground-engaging means of the agricultural working machine, for steering support and a method for implementing the control and regulating.

Agricultural working machines such as tractors, self-propelled harvesting machines, or earth-moving vehicles (without limitation), usually comprise multiple axles, wherein an axle for changing the direction of travel is equipped, for example, with steerable wheels and wherein a change in the direction of travel takes place along a turning circle specified by the steering of the wheels. For the purpose of deceleration, working machines comprise not only a service brake, which provides for a uniform deceleration in the direction of travel without lateral distortion, but also a so-called steering brake. This steering brake provides for a unilateral braking of a driven wheel such that, during off-road travel, it is possible to travel around curves that are narrower than the turning circle that is specified by the steerable wheels. For this purpose, in order to support the steering, the driven wheels on the side of the vehicle on the inside of the curve can be braked, while the wheels on the opposite side of the vehicle can continue to be driven without being braked.

In modern, and all-wheel drive, working machines having large tire dimensions on the front axle and improved ballasting of the front axles with a correspondingly effective steering-knuckle steering, the steering brake is usually used on muddy ground surfaces and when ballasting is unfavorable, in order to improve the steerability or to allow for particularly small turning clearance circles. This makes it possible, for example, at a headland, to travel through very small turning radii with the attached implement raised in the rear and with a correspondingly reduced load on the front axle.

Such steering brakes are known from DE 1 270 961 B and from EP 2 093 111 A1, wherein, in each case, a manual actuation of the steering brake is carried out by the operator of the working machine. EP 0 863 062 B12 makes known a brake system for increasing the driving safety for a tractor, which, in particular in the case of an all-wheel drive tractor, provides for an individual and side-specific control of the brakes in order to avoid a lockup of the wheels even under adverse conditions, which would overtax conventional antilock brake systems.

The disadvantage of steering brakes used nowadays is the need for manual actuation and the frequent dosing of the braking force. For this purpose, two brake pedals are usually provided, which brake pedals are disposed next to one another and can be actuated individually or jointly. The driver can be easily overtaxed, for example, at a headland, if a headland management system is unavailable, since the control of the attached implement is already consuming his full attention. In addition, the dosing of the braking force, in particular, in the case of power brakes, is not easy. As a rule, the rear axle is braked more strongly than would be necessary in order to achieve the steering angle set at the front axle. This results in an unsteady steering procedure and strain in the chassis elements.

SUMMARY OF THE INVENTION

The present invention overcomes the shortcomings of known arts, such as those mentioned above.

To do so, the invention provides a device for the steering support for an agricultural working machine, which provides for relief for the operator, an improvement in steerability and an increase in safety over known devices and method of use.

In one embodiment, the invention provides an agricultural working machine comprising at least a first axle and a second axle, multiple ground-engaging means disposed at the axles that are at least partially drivable by a drive engine or are steerable by steering-knuckle steering, or are at least partially drivable by a drive engine and are steerable by steering-knuckle steering. Also included is at least one steering-angle sensor disposed at a steerable ground-engaging means for detecting a set steering angle of the associated steering ground-engaging means, and at least one steering brake for the selective braking of one or multiple drivable, ground-engaging means for steering support. A control unit for the control and regulation of the at least one of the steering brake also is provided. A steering angle and/or a slip angle of at least one steerable ground-engaging means is determined, and the steering brake is controlled and regulated depending on the steering angle and/or the slip angle.

An agricultural working machines usually comprise multiple axles having ground-engaging means disposed thereon for the propulsion and steering of the working machine. Tractors, for example, comprise a first and a second axle, wherein the first axle corresponds to the front axle and the second axle corresponds to the rear axle, each of which has ground-engaging means disposed thereon so as to be steerable and/or drivable. A steering of the ground-engaging means, in particular, at the front axle of the tractor, can be carried out, in this case, by means of steering-knuckle steering. In this case, an operator of the working machine specifies a steering angle in order to pivot the steered ground-engaging means. The specified steering angle is detected by at least one steering-angle sensor at at least one steered ground-engaging means. In addition to a service brake, which is usually pressure-medium controlled, for example, hydraulic, which service brake is used during road travel, in particular, and provides for a substantially uniform braking of the working machine on both sides, the working machine also comprises a steering brake. The steering brake provides for a separate braking of at least one of the ground-engaging means, which braking is separated for the different sides.

In the case of a tractor, the ground-engaging means, which are disposed at the rear axle and are driven, are usually braked individually and separately for the different sides, whereby yaw moments are generated for supporting the steered ground-engaging means. This makes it possible to further reduce a turning circle, which is defined by the steering ground-engaging means, for example, the front axle, and to thereby realize very narrow turning radii, for example, in a headland. Using a control unit connected to the at least one steering-angle sensor, designed for the control and regulation of at least one of the steering brakes, a selective braking of one or multiple, in particular, driven ground-engaging means is automatically carried out depending on the steering angle, which is set, in particular, a slip angle of at least one of the steered ground-engaging means or both. The slip angle in this case is the difference between the set steering angle (which is the theoretical or expected steering angle) and an actual steering angle. The set steering angle, set by the driver by turning a steering wheel for example, is equivalent to the "theoretical" angle, which is the angle that should be reached according to the turning of the steering wheel, for example. The slip angle is decisive for an actual change in the direction of travel of the working machine. The braking force of the steering brake is regulated depending on the steering angle and/or the slip angle in accordance with the set steering angle and/or the slip angle.

As a result of the automatic steering and regulation of the steering brake depending on the steering angle and/or the slip angle, the operator of the working machine is relieved, since a manual actuation is eliminated. In addition, as a result of the automatic activation and control of the steering brake, incorrect operation by the operator can be avoided, whereby safety is increased. The activation as well as control and regulation of the steering brake is carried out as needed, whereby not only is efficient use of the steering brake made possible, but also a more precise regulation of the particular brake engagements, thereby making it possible to avoid overbraking and unnecessary strain in the drive train. As a result, the steering support of the steering-knuckle steering is improved and the steerability in the case of difficult ground conditions or a low front-axle load is further improved.

In an embodiment, a control and regulation of the steering brake is carried out at least depending on the set steering angle, an output speed of a transmission of the working machine and a circumferential speed of at least one drivable ground-engaging means disposed on the inside of the curve, in particular. In the case of a tractor, drivable ground-engaging means are disposed, for example, at the second axle, i.e., the rear axle. In addition to the set steering angle, which can be detected by at least one steering-angle sensor, for example at a ground-engaging means disposed on the inside of the curve, a control of the steering brake based on a purely geometric steering configuration is carried out on the basis of the output speed of the transmission and the circumferential speed of at least one drivable ground-engaging means. This has the advantage that the control and regulation of the steering brake is carried out independently of ground surfaces and vehicle configurations and, as a result, is more robust on muddy ground surfaces.

The slip angle of at least one steerable ground-engaging means can be determined depending on the set steering angle, the working machine geometry and the actual, circumferential speeds on the inside of a curve and the outside of a curve of ground-engaging means disposed at a driven axle. The build-up of the slip angle at the steered ground-engaging means is necessary in order to build up cornering forces, wherein the movement of the working machine takes place in the direction of the actual steering angle. The slip angle corresponds to the difference between the set steering angle and the actual steering angle of a ground-engaging means. As a result of accounting for the slip angle for the control and regulation of the steering brake, an efficient steering support is made possible, which carries out a braking of an individual ground-engaging means on the inside of a curve only to the extent necessary for the actual steering movement, and not according to the set or theoretical steering movement. It is advantageous that a bulk of the yaw moment for steering the working machine is therefore generated via the front axle, and the steering brake merely supports the actual steering movement of the working machine.

In an embodiment, an activation of the steering brake is carried out depending on a ratio of a theoretical circumferential speed and an actual circumferential speed of at least one driven ground-engaging means. In the case of a tractor, the driven ground-engaging means are disposed, for example, at the rear axle, i.e., the second axle. The ratio of the circumferential speeds is specified by the operator as a first threshold value and, for example, is stored in the control unit. As a result, an excessive activation of the steering brake can be avoided, wherein the efficiency of the working machine is improved as a result of the reduced braking of a driven ground-engaging means.

In another embodiment, an activation of the steering brake is carried out depending on a limiting speed, wherein the steering brake is activated if the limiting speed is exceeded. The limiting speed, below which the steering brake is activated, is specified as a second threshold value and is stored in the control unit and/or can be set by the operator. As a result of the second, speed-dependent threshold value, it is ensured that an activation of the steering brake is possible only during field work carried out at correspondingly low speeds of, for example, less than 15 km/h. An activation at a speed above the second threshold value, for example, during road travel, is therefore be avoided, whereby the traffic safety of the working machine is substantially increased. In addition, an activation of the steering brake is carried out depending on a position-detection signal, for example, a satellite-supported navigation device, whereby an activation on specified surfaces is ensured. The traffic safety is further increased in that a disengagement of the brake pedals, which was previously necessary for activating the manually controlled steering brake, and a reconnection of the brake pedals can be omitted during road travel, thereby making it possible to avoid dangerous situations resulting from engaged or disengaged brake pedals.

In another embodiment, an activation of the steering brake is carried out depending on a limiting steering angle and/or a limiting slip angle, wherein the steering brake is activated if they are exceeded. The limiting steering angle and/or the limiting slip angle, above which the steering brake is activated, is specified as a third threshold value and is stored in the control unit or can be set by the operator or both. As a result, small steering movements, for example, having a set steering angle of less than 10°, can be carried out purely via steering-knuckle steering of the first axle, i.e., the front axle, whereby an excessive actuation of the steering brake, which adversely affects the drive power, is avoided and, therefore, the efficiency of the working machine is increased.

Preferably, the working machine comprises a gyroscope for detecting an angular velocity of the working machine, in particular, for determining the actual steering angle. The gyroscope is connected to the control unit in order to determine the angular velocity, in particular, about an instantaneous center and in order to determine the actual steering angle. As a result, the slip angle for the control and regulation of the steering brake is determined in a low-cost manner.

In an embodiment, a navigation system, which is satellite-supported, is provided. Using the position data of the navigation system, a curve radius of at least one of the axles is determined, for example, the actual steering angle. The navigation system is connected to the control unit in order to determine a curve radius of at least one of the axles, for example, the front axle and/or the rear axle, and, in particular, in order to determine the actual steering angle. As a result, a determination of at least one curve radius, which is required for the slip angle-based control and regulation of the steering brake, is made possible in a low-cost manner. In addition, based on the position data of the navigation system, an automated utilization of the steering brake for supporting an automated turning procedure can be made possible even in the case of difficult ground conditions or unfavorable vehicle configurations, for example, in a headland.

A ground-engaging means is preferably designed in the form of a wheel or a crawler track. The agricultural working machine can be equipped exclusively with ground-engaging means in the form of wheels or crawler tracks, or in the form of a so-called half-track, in which case the working machine comprises wheels as well as crawler tracks. In the case of a working machine in the form of a half-track, steerable wheels are disposed at the first axle, i.e., the front axle, while driven crawler tracks are disposed at the second axle, i.e., the rear axle. The advantages of both ground-engaging means can be realized in the case of a half-track configuration as a tractor. The front axle having wheel-based steering-knuckle steering, as is common for tractors, provides a steering behavior which the operator finds familiar and easy to handle. Small steering corrections and cornering can be carried out without the use of complicated differential steering gearboxes, thereby making a simple vehicle concept possible with low manufacturing costs. In addition, the steerability of the working machine can be improved in the case of difficult ground conditions or increased turning-resistance moment on the rear axle, due to the crawler tracks, automated by a corresponding activation of the steering brake.

The invention further includes a steering-support method for an agricultural working machine comprising at least a first axle and a second axle, multiple ground-engaging means disposed at the axles and designed to be at least partially drivable by a drive engine and/or steerable by means of steering-knuckle steering, at least one steering-angle sensor disposed at a steerable ground-engaging means for detecting a set steering angle of the associated ground-engaging means, at least one steering brake for the selective braking of one or multiple drivable, ground-engaging means of an axle for the steering support and a control unit for the control and regulation at least of the steering brake. In the method, a steering angle is set and/or a slip angle of at least one steerable ground-engaging means is determined, and the steering brake is controlled and regulated depending on the steering angle and/or the slip angle.

As a result of the automatic steering and regulation of the steering brake depending on the steering angle and/or the slip angle, the operator of the working machine is relieved, since a manual actuation is eliminated. In addition, as a result of the automatic activation and control of the steering brake, incorrect operation by the operator is avoided, whereby safety is increased. The activation as well as control and regulation of the steering brake can be carried out as needed, whereby not only is efficient use of the steering brake made possible, but also a more precise regulation of the particular brake engagements, thereby making it possible to avoid overbraking and unnecessary strain in the drive train. As a result, the steering support of the steering-knuckle steering is improved and the steerability in the case of difficult ground conditions or a low front-axle load is further improved.

Advantageously, an activation of the steering brake is carried out depending on a ratio between a theoretical circumferential speed and an actual circumferential speed of at least one driven ground-engaging means, a limiting speed, and/or a limiting steering angle, and/or a limiting slip angle. In this case, an activation is intended to mean that the steering brake is controlled and regulated by the control unit. If the steering brake is not activated, an actuation of the steering brake, i.e., single-wheel braking for steering support, is not possible. The steering angle, slip angle and/or speeds can be specified as threshold values, wherein the steering brake is activated if values exceed or fall below the thresholds. Likewise, it is conceivable to use position data of a navigation system, which is satellite-based, as position-based threshold values. This has the advantage, for example, that an excessive activation as well as control and regulation of the steering brake or an activation during road travel is avoided.

Preferably, an angular velocity of the working machine is determined using a gyroscope, in particular, for determining the slip angle of at least one ground-engaging means. An angular velocity of the working machine, about an instantaneous center, can be determined using the gyroscope. As a result, the slip angle for the control and regulation of the steering brake is determined in a low-cost manner.

Also, a curve radius of at least one axle is determined using a navigation system, which is satellite-supported. As a result, a determination of at least one curve radius, which is required for the slip angle-based control and regulation of the steering brake, is made possible in a low-cost manner.

BRIEF DESCRIPTION OF THE DRAWINGS

Further features and advantages of the invention will become apparent from the description of embodiments that follows, with reference to the attached figures, wherein:

FIG. 1 shows a schematic side view of an agricultural working machine;

FIG. 2 shows a schematic view of an axle arrangement of an agricultural working machine comprising a steered and a driven axle;

FIG. 3b shows a schematic detailed view of a steered ground-engaging means of the axle arrangement shown in FIG. 3a.

DETAILED DESCRIPTION OF THE PREFERRED EMBODIMENTS

Figure 3A:
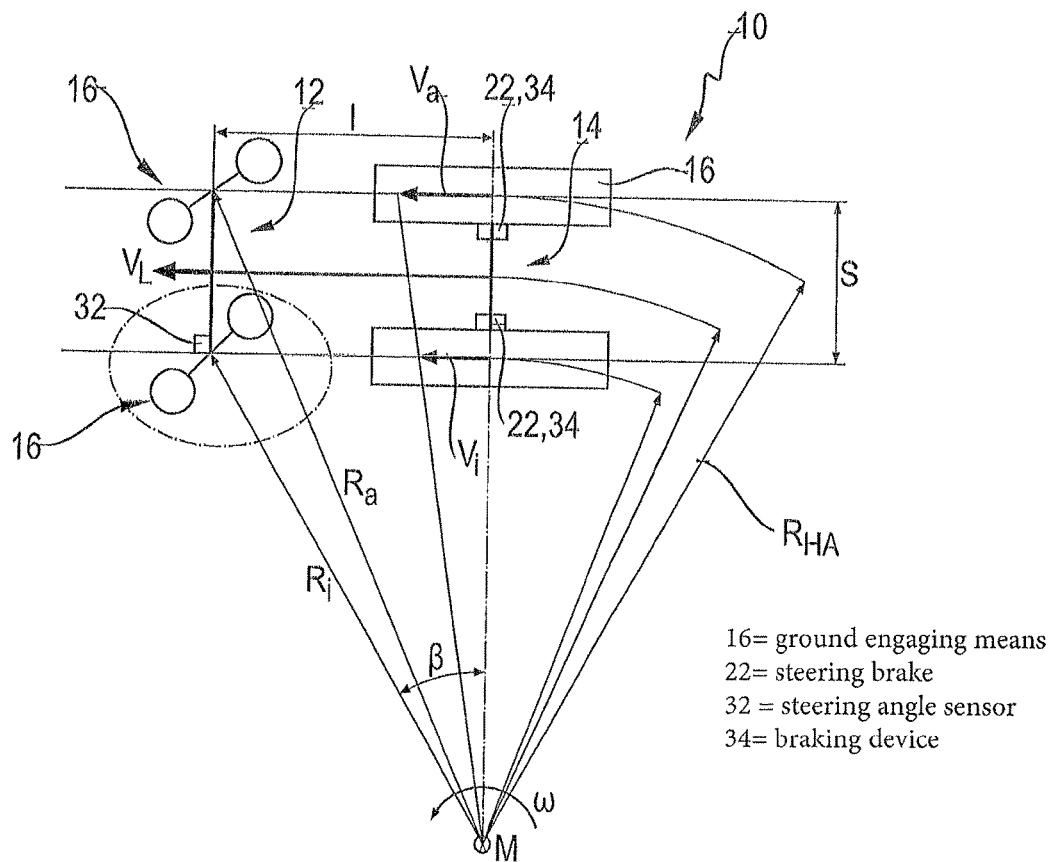
FIG. 3a shows a schematic depiction of an axle arrangement of a working machine for the slip angle-based control and regulation of the steering brake.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

A schematic side view of an agricultural working machine 10 in the form of a tractor constructed according to the inventive principles is depicted in FIG. 1. Please note, however, that an agricultural working machine 10 constructed according to the invention also can be a self-propelled harvesting machine such as a combine harvester or a forage harvester, or any other type of working machine used for agricultural work. The exemplary agricultural working machine 10 in the form of a tractor comprises a first axle 12 in the form of a steered front axle and a second axle 14 in the form of a rigid rear axle. In the case of a self-propelled harvesting machine such as a combine harvester, the first axle can be, for example, a steered rear axle and the second axle can be a rigid front axle. Ground-engaging means 16 are disposed at each of the axles 12, 14. The ground-engaging means 16 can be wheels or crawler tracks.

The agricultural working machine 10 can be equipped exclusively with wheels or crawler tracks, or in the form of a so-called half-track. Where the agricultural working machine 10 is a half-track, ground-engaging means 16 in the form of wheels are disposed at one axle and ground-engaging means 16 in the form of crawler tracks are disposed at another axle. In the case of a working machine 10 in the form of a tractor comprising half-tracks, steerable wheels are disposed at the first axle 12, i.e., the front axle, and crawler tracks are disposed at the second axle 14, i.e., the rear axle. The ground-engaging means 16 at the first axle 12 are designed so as to be steerable using steering-knuckle steering.

The working machine 10 comprises a drive engine 18, which is operatively connected to the second axle 14, i.e., the rear axle, via a transmission 20 and a drive train 22, in order to bring a drive torque provided by the drive engine 18 to the rear axle. While the working machine 10 is depicted in FIG. 1 having a rear-wheel drive, the steering support according to the invention also can be used for working machines having all-wheel drive, in which case one axle can be steerable and/or drivable. A differential gearbox (not illustrated) is usually disposed at the driven axle 14 in order to distribute the drive torque to the ground-engaging means 16. A steering brake 22 is disposed at the second axle 14, i.e., the rear axle, which provides for a unilateral braking of ground-engaging means 16 of the second axle 14. Assigned to each of the ground-engaging means 16 at the second axle 14 are braking devices 34, which are jointly actuated as a service brake in order to reduce the speed of the working machine 10, for example, during road travel. These braking devices 34 can be actuated individually, on a particular side, as a steering brake 22, whereby a unilateral deceleration of the working machine 10 is made possible in order to achieve a very small turning radius. Braking devices 34 of a service brake and/or a steering brake 22 of a modern agricultural working machine 10 are usually hydraulically actuatable, wherein, for the purpose of a brake engagement, a hydraulic brake pressure is built up, which results in a braking force at the corresponding ground-engaging means 16.

At the driven second axle 14, a "revolutions per minute" sensor 26 is assigned to one or both ground-engaging means 16 disposed at the axle 14, in order to detect the speed of the particular ground-engaging means 16. The output speeds of the drive engine 18 and the transmission 20 are determined via a drive-motor sensor 28 and a transmission sensor 30. In addition, the operative gear ratio of the transmission 20 is determined via the transmission sensor 30 and the output speed of the drive engine 18. At the steerable first axle 12, i.e., the front axle, a steering-angle sensor 32 is disposed on one or both ground-engaging means 16, by which a steering angle $\delta$ set at the particular ground-engaging means 16 is determined. The steering angle $\delta$ is set depending on a steering movement of an operator of the working machine 10, for example, via a steering wheel, in order to change the direction of travel of the working machine 10. The steering angle $\delta$ in this case is the steering angle $\delta$ set at a ground-engaging means 16, i.e., the angle through which the ground-engaging means 16 is deflected out of its initial position for straight-ahead travel of the working machine 10.

According to the invention, the steering brake 22 of the agricultural working machine 10 is automatically actuated by a control unit 24 depending on a steering angle $\delta_{th}$, which has been set and/or a slip angle $\alpha$, in order to support a steering movement of the working machine 10, which is specified via the first axle 12, i.e., the steerable front axle. The agricultural working machine 10 comprises a gyroscope 38 for the slip angle-based control and regulation of the steering brake 22, which gyroscope is connected to the control unit 24 for the purpose of signal transmission. A navigation system 40, which is satellite-based, in particular, of the working machine 10 is likewise connected to the control unit 24, and so position signals of the navigation system 40 are utilized by the control unit 24, in particular for a slip angle-based control and regulation of the steering brake 22.

FIG. 2 shows a schematic top view of an axle arrangement of an agricultural working machine 10 having a steering brake 22 and the geometric relationships of the axle arrangement, such as the track s and the wheelbase I of the working machine 10. The first axle 12 is a steered front axle having ground-engaging means 16, for example, wheels or crawler tracks, disposed thereon. The ground-engaging means 16 are each deflected through a set steering angle $\delta$, for example, by use of a steering-knuckle steering (not illustrated), wherein the ground-engaging means 16 on the inside of the curve is deflected through the steering angle $\delta_i$, which is greater than the steering angle $\delta_a$ of the ground-engaging means 16 on the outside of the curve, since the curve radius of the inner ground-engaging means 16 is smaller than the curve radius of the outer ground-engaging means 16. For the front axle, a mean value $\delta_m$ can be calculated on the basis of the steering angles $\delta_i$, $\delta_a$ of the inner and the outer ground-engaging means 16 on which the curve radius $R_{VA}$ of the front axle is based. Due to the curve radius $R_{HA}$ passed through by the second axle 14, i.e., the rear axle, at the speed $v_m$ in the center point thereof, the circumferential speeds $v_i$, $v_a$ of the ground-engaging means 16 on the inside of the curve and on the outside of the curve have different values. The circumferential speeds $v_i$, $v_a$ of the ground-engaging means 16 are dependent on the set steering angles $\delta_i$, $\delta_a$, wherein the circumferential speed $v_i$ of the ground-engaging means 16 on the inside of the curve is set by the steering brake 22 for the purpose of providing steering support in accordance with the set steering angle $\delta_i$.

The control and regulation of the steering brake 22 is based only on the geometric steering configuration and is carried out depending on the set steering angle $\delta_i$, $\delta_a$, of at least one ground-engaging means 16, which angle can be detected by a steering-angle sensor 32, for example, at the ground-engaging means 16 on the inside of the curve. The steering angle $\delta_a$ of the ground-engaging means 16 located on the outside of the curve can be determined via the steering kinematics of the first axle 12, which is stored in the control unit 24. For the purpose of controlling and regulating the steering brake 22, the control unit 24 requires not only the theoretical circumferential speed $v_{i,th}$, $v_{a,th}$ of the inner and the outer ground-engaging means 16, but also their actual circumferential speeds $v_{i,tat}$, $v_{a,tat}$, whereby, for example, the influence of excessive slip is compensated for and excessive braking of the inner ground-engaging means 16 is avoided. The theoretical circumferential speeds $v_{i,th}$ and $v_{a,th}$ of the inner and the outer ground-engaging means 16 are determined via the geometric relationships at the rear axle 14. The actual circumferential speed $v_{i,tat}$, $v_{a,tat}$ of the ground-engaging means 16 on the inside of the curve and on the outside of the curve are determined on the basis of their measured speeds and the particular rolling radii, for example, of the wheels or crawler tracks. In this case, just one revolution per minute sensor 26 at a ground-engaging means 16 is sufficient, since the speed measured at the ground-engaging means 16 corresponds to the speed of an output shaft of the differential 36, which output shaft is driving the ground-engaging means 16. The speed of the other output shaft and, therefore, of the other ground-engaging means 16 is determined from the speed of the input shaft of the differential 36 and from the gear ratio of the differential 36. The speed of the input shaft of the differential 36 corresponds to the speed of the output shaft of the transmission 20, which is determined by the transmission sensor 30. Without a transmission sensor 30, the output speed of the transmission 20 is determined from the speed of the drive motor 12 and the operative transmission ratio.

A control and regulation of the steering brake 22 is reliably carried out on the basis of the set steering angle $\delta_{i,th}$, $\delta_{a,th}$ which is detected by a steering-angle sensor 32, the speed of a ground-engaging means of the second axle 14, which is detected by the revolutions per minute sensor 26, and the output speed of the transmission 20. In this case, the control unit 24, with the aid of the aforementioned sensor variables and the geometric relationships, determines at least both the theoretical, i.e., the set, as well as the actual circumferential speed $v_{i,th}$, $v_{i,tat}$ of the ground-engaging means 16 on the inside of the curve and can regulate the steering brake 22 correspondingly. In this case, a deviation between the theoretical and the actual circumferential speed $v_{i,th}$ and $v_{i,tat}$ of the ground-engaging means 16 on the inside of the curve can be eliminated, for example, using a control loop, by actuating the steering brake 22 accordingly, in particular the braking device 34 on the inside of the curve. Another advantage is that the speed $v_m$ of the center point of the rear axle 14 also can be ascertained from the drive train, whereby the system is unsusceptible to the high slip values that often occur on muddy ground.

FIG. 3a shows an embodiment of the steering brake 22 according to the invention, wherein a control and regulation of the steering brake 22 is carried out by the control unit 24 depending on at least one slip angle α of a steered ground-engaging means 16 at the first axle 12, i.e., the front axle. The slip angle α of a ground-engaging means 16 is the angle between the theoretical steering angle $\delta_{th}$, which is set via the steering, and the steering angle $\delta_{tat}$ that is actually effectuating the movement of the working machine. A small slip angle α is necessary in this case so that the ground-engaging means 16 can build up cornering forces in order to change the direction of travel.

The regulation of the steering brake 22 and, in particular, of the brake pressure of each side of the steering brake 22 is carried out on the basis of a slip angle α, which is determined by the control unit 24 and is formed from the difference of the set steering angle $\delta_{th}$ and the actual steering angle $\delta_{tat}$. The speed of the ground-engaging means 16 is influenced via the control of the steering brake 22, the difference of which exerts an influence on the actual steering angle $\delta_{tat}$. Therefore, the actual steering angle $\delta_{tat}$ is increased, for example, by a deceleration—on the inside of the curve—of the inner ground-engaging means 16 such that the actual steering angle is moved toward the set steering angle $\delta_{i,th}$, $\delta_{a,th}$ is reduced as a result. The result thereof is that the working machine 10 changes its direction of travel substantially on the radius through the set ground-engaging means 16. The regulation of the steering brake 22 is carried out starting at a specified limiting slip angle $\alpha_G$, whereby the build-up of cornering forces is made possible by a small slip angle α.

The regulation of the steering brake 22 depending on the slip angle α has the advantage, as compared to a use of only a set steering angle, that a bulk of the yaw moment of the working machine 10 can thereby be realized via the steered first axle 12, which, due to the steering-knuckle steering disposed there, is more efficient than the steering brake 22. In order to regulate the steering brake 22, the set, theoretical steering angle $\delta_{i,th}$, $\delta_{a,th}$ to of a ground-engaging means 16 is therefore compared, using the control unit 24, with its actual steering angle $\delta_{tat}$, and their difference is used to determine the slip angle α. The portion of the working machine 10 schematically depicted in a top view in FIG. 3a comprises ground-engaging means 16 in the form of wheels on the front axle 12, i.e., the steered front axle. Ground-engaging means 16, for example, in the form of crawler tracks, are disposed at the second axle 14, i.e., the driven rear axle. The determination of the slip angle $\alpha_i$ for a ground-engaging means 16 disposed on the inside of the curve is described in the following, although the determination of the slip angle $\alpha_a$ can be carried out in an analogous manner.

Figure 3B:
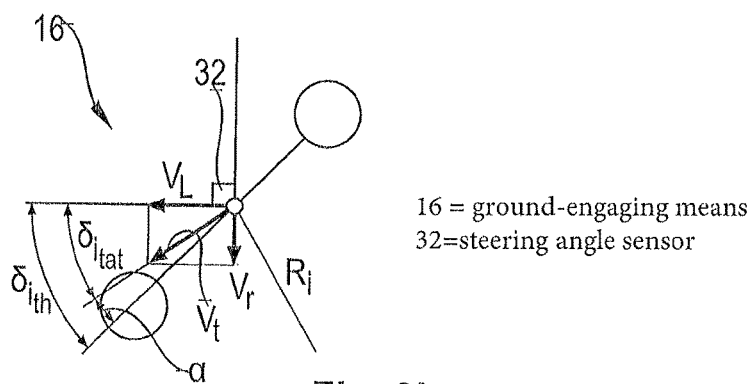

The slip angle $\alpha_i$ of the wheel 16 on the inside of the curve, which slip angle is supposed to be determined, is determined from the difference of the set steering angle $\delta_{i,th}$ and the actual steering angle $\delta_{i,tat}$. The set steering angle $\delta_{i,th}$ of the wheel 12 on the inside of the curve at the steered front axle 12 is determined directly by the steering-angle sensor 32. The actual steering angle $\delta_{tat}$ is determined via the known geometric conditions of the working machine 10, such as the track s and the wheelbase I, values for both of which are be stored in the control unit 24, and on the basis of the circumferential speeds vi, $v_a$ of the two driven ground-engaging means 16 of the second axle 14, for example, the inner crawler track and the outer crawler track. The difference of the two circumferential speeds $v_{i,a}$ of the driven ground-engaging means 16, which can be determined via the curve radius $R_{HA}$ of the rear axle 14 and, if necessary, the track S, corresponds to the speed $v_L$ at the front axle 12, which is effective for the steering. Based on this speed $v_L$ (FIG. 3b), in combination with the speed $v_t$ acting in the actual steering direction, the actual steering angle $\delta_{i,tat}$ can be determined, wherein the speed $v_t$ can be determined via an angular velocity ω of the working machine 10 about an instantaneous center M and the curve radius $R_i$ of the inner wheel.

The angular velocity ω also can be determined, for example, by use of a gyroscope, for example, an inertial measuring unit or a gyro-stabilized platform. The curve radius $R_{HA}$, for example, of the rear axle is determined by evaluating the position data using an available navigation system, which is satellite-supported, in particular.

Threshold values can be specified in order to further improve an activation and the control and regulation of the steering brake. For example, a limiting speed can be specified, below which an activation of the steering brake is made possible, whereas activation is not possible at a speed of the working machine above the limiting speed, for example, during road travel of the working machine at a speed above the limiting speed. Likewise, a limiting angle $\delta_G$, $\alpha_G$ can be specified, for example, for the steering angle $\delta$ and/or the slip angle $\alpha$, wherein an activation of the steering brake 22 first takes place at an angle above the limiting angle $\delta_G$, $\alpha_G$.

Figure 4:
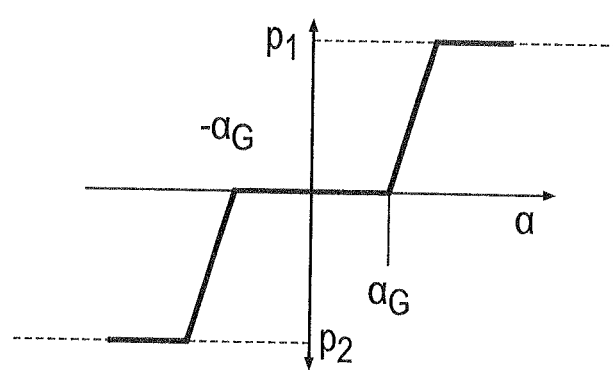
FIG. 4 shows a diagram of the response characteristic of the steering brake depending on a slip angle.

FIG. 4 shows a diagram, in which the relationship of the slip angle $\alpha$ with respect to a brake pressure P1, 2, which act on the steering brake 22, in particular the braking devices 34, is depicted. Below the limiting angle $\alpha_G$ for the slip angle $\alpha$, the steering brake 22 is not actuated, either in a left-hand curve (left side of the diagram) or in a right-hand curve (right side of the diagram). As a result, small slip angles $\alpha$ or steering angles $\delta$ are tolerated, and so smaller steering movements take place exclusively via the steering, in particular, the steering-knuckle steering, of the front axle 12, which steers more efficiently than the steering brake 22. In addition, as a result, the efficiency of the working machine 10 during towing is increased, since a braking of the driven ground-engaging means 16 first takes place above the limiting angle $\delta_G$, $\alpha_G$. If the limiting angle $\delta_G$, $\alpha_G$ is exceeded, a regulation of the steering brake 22 is carried out in accordance with the defined curve up to a maximum brake pressure for supporting the steering of the working machine 10.

LIST OF REFERENCE NUMBERS 10 agricultural working machine
12 first axle
14 second axle
16 ground-engaging means
18 drive engine
20 transmission
22 steering brake
24 control unit
26 revolutions per minute sensor
28 drive engine sensor
30 transmission sensor
32 steering-angle sensor
34 braking device
36 differential
38 gyroscope
40 navigation system
$\delta_i$ steering angle of the ground-engaging means on the inside of the curve
$\delta_a$ steering angle of the ground-engaging means on the outside of the curve
$\delta_m$ mean value of the steering angle
$\delta_{th}$ set steering angle
$\delta_{tat}$ actual steering angle
$\delta_G$ limiting steering angle
$\alpha$ slip angle
$\alpha_G$ limiting slip angle
$R_{VA}$ curve radius of the front axle
$R_{HA}$ curve radius of the rear axle
$r_i$ curve radius of the inner ground-engaging means
$r_a$ curve radius of the outer ground-engaging means
$v_i$ circumferential speed of the ground-engaging means on the inside of the curve
$v_a$ circumferential speed of the ground-engaging means on the outside of the curve
$v_m$ speed of the rear axle
$v_L$ speed of the front axle
$v_r$ speed in the radial direction
$v_t$ speed in the direction of the actual steering angle
$\omega$ angular velocity
M instantaneous center
$P_{1,2}$ brake pressure
I wheelbase
s track As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural working machine comprising:
a first axle disposed at a front of the machine;
a second axle disposed at a rear of the machine;
multiple ground-engaging means disposed at the first axle and the second axle, wherein the multiple ground engaging means are configured to be drivable by a drive engine or are configured to be steerable using steering-knuckle steering means or are configured to be both drivable by a drive engine and steerable using steering-knuckle steering means;
at least one steering-angle sensor disposed at an associated steerable ground-engaging means for detecting a set steering angle ($\delta_{th}$) of the associated steerable ground-engaging means;
at least one steering brake for the selective braking of one or more of the drivable ground-engaging means on the second axle for steering support; and
a controller for controlling and regulating the at least one steering brake;
wherein a slip angle ($\alpha$) of the steerable ground-engaging means is determined, and the controller is configured for automatically activating the at least one steering brake during a turning action of the agricultural machine in response to an operator turning a steering wheel, depending on the slip angle ($\alpha$) or both the set steering angle ($\delta_{th}$) and the slip angle ($\alpha$), wherein based on said configuration of the controller, manual activation of the steering brake during the turning action is not required, and the turning rate can be increased due to activation of the at least one steering brake.

2. The agricultural working machine according to claim 1, wherein the controller controls and regulates the at least one steering brake depending on the set steering angle ($\delta_{th}$), an output speed of a transmission of the working machine and a circumferential speed ($v_i$, $v_a$) of at least one drivable ground-engaging means, which is disposed on an inside of a curve.

3. The agricultural working machine according to claim 2, wherein the slip angle ($\alpha$) of the at least one steerable ground-engaging means is determined depending on the steering angle ($\delta_{th}$), a working machine geometry (I, s) and the circumferential speeds ($v_i$, $v_a$) on an inside of a curve and on an outside of a curve of the at least one steerable ground-engaging means.

4. The agricultural working machine according to claim 1, wherein an activation of the at least one steering brake is carried out depending on a ratio between a theoretical circumferential speed ($v_{i,\,th}$, $v_{a,\,th}$) and an actual circumferential speed ($v_{i,\,tat}$, $v_{a,\,tat}$) of at least one driven ground-engaging means.

5. The agricultural working machine according to claim 1, wherein the at least one steering brake is activated if the machine speed drops below a limiting speed ($v_G$).

6. The agricultural working machine according to claim 1, wherein the at least one steering brake is activated if a steering angle exceeds a limiting steering angle ($\delta_G$), if a slip angle exceeds a limiting slip angle ($\alpha_G$) or both.

7. The agricultural working machine according to claim 1, further comprising a gyroscope for detecting an angular velocity ($\omega$) of the working machine.

8. The agricultural working machine according to claim 7, wherein the gyroscope determines an actual steering angle ($\delta_{i,\,tat}$, $\delta_{a,\,tat}$).

9. The agricultural working machine according to claim 1, further comprising a navigation system that is satellite-supported and provides position data for determining a curve radius ($R_{HA}$, $R_{VA}$) of one of the first axle and the second axle.

10. The agricultural working machine according to claim 8, wherein the actual steering angle ($\delta_{i,\,tat}$, $\delta_{a,\,tat}$) is determined by a curve radius ($R_{HA}$, $R_{VA}$).

11. The agricultural working machine according to claim 1, wherein one of the multiple ground-engaging means is a wheel or a crawler track.

12. A steering-support method for an agricultural working machine comprising at least a first axle located at a front of the machine and a second axle located at a rear of the machine, multiple ground-engaging means disposed at the at least first and second axles (12, 14) that are at least partially drivable by a drive engine, are steerable using steering-knuckle steering, or both, at least one steering-angle sensor disposed at a steerable one of the multiple ground-engaging means for detecting a set steering angle ($\delta_{th}$) of the steerable one of the multiple ground-engaging means, at least one steering brake for the selective braking of a driving one of the multiple ground-engaging means on the second axle for steering support and a control unit for the controlling and regulating the at least one steering brake, the method comprising the steps of:

determining a slip angle ($\alpha$) of at least one steerable ground-engaging means or determining a set steering angle ($\delta_{th}$) and a slip angle ($\alpha$) of at least one steerable ground-engaging means; and automatically controlling and activating the at least one steering brake depending on the slip angle ($\alpha$) or both the set steering angle ($\delta_{th}$) and the slip angle ($\alpha$) during a turning action of the agricultural machine in response to an operator turning a steering wheel of the agricultural working machine, wherein manual activation of the steering brake during the turning action is not required.

13. The steering-support method according to claim 12, further comprising activating the at least one steering brake depending on one or more of the group consisting of at least one of the following: a ratio between a set circumferential speed ($v_{i,\,th}$, $v_{a\,th}$) and an actual circumferential speed ($v_{i,\,tat}$, $v_{a,\,tat}$) of at least one driven ground-engaging means, a limiting speed ($v_G$), a limiting steering angle ($\delta_G$) and a limiting slip angle ($\alpha_G$).

14. The steering-support method according to claim 13, further comprising determining an angular velocity of the working machine using a gyroscope.

15. The steering-support method according to claim 14, further comprising determining the slip angle ($\alpha$) of the at least one ground-engaging means using the gyroscope.

16. The steering-support method according to claim 14, further including determining a curve radius ($R_{HA}$, $R_{VA}$) of at least one of the first axle and the second axle using a satellite-supported navigation system.

* * * * *